(12) United States Patent
Codilian et al.

(10) Patent No.: US 6,760,186 B1
(45) Date of Patent: Jul. 6, 2004

(54) DISK DRIVE HAVING FIRST-WRITTEN SERVO WEDGE MARKED AND METHOD FOR FORMING MARKED SERVO WEDGES

(75) Inventors: Raffi Codilian, Irvine, CA (US); Jim G. Saunders, Laguna Hills, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 476 days.

(21) Appl. No.: 09/728,551

(22) Filed: Nov. 30, 2000

(51) Int. Cl.[7] .............................................. G11B 5/596
(52) U.S. Cl. ........................ 360/77.11; 360/75; 360/51; 360/77.08
(58) Field of Search ............................. 360/75, 77.08, 360/77.11, 51

(56) References Cited

U.S. PATENT DOCUMENTS

| | | | | |
|---|---|---|---|---|
| 4,131,920 A | * | 12/1978 | Berger | 360/51 |
| 5,339,204 A | * | 8/1994 | James et al. | 360/51 |
| 5,448,429 A | * | 9/1995 | Cribbs et al. | 360/75 |
| 5,668,679 A | * | 9/1997 | Swearingen et al. | 360/75 |
| 5,790,332 A | * | 8/1998 | Bucska | 360/51 |
| 5,796,541 A | * | 8/1998 | Stein et al. | 360/75 |

* cited by examiner

*Primary Examiner*—David Hudspeth
*Assistant Examiner*—Jason Olson
(74) *Attorney, Agent, or Firm*—Milad G. Shara, Esq.; Knobbe Martens Olson & Bear; Ramin Mobarhan, Esq.

(57) ABSTRACT

A disk drive having a marker for identifying the transition between the first and last written servo wedges on a servo track. The marker indicates the likely position where closure error may occur during the operation of the hard disk drive. The marker is used by the control system of a hard disk drive to provide appropriate position control signals to the transducer assembly to maintain the proper positioning of the transducer about the disk surface. A method for forming the marker on a disk surface is further disclosed.

17 Claims, 6 Drawing Sheets

DISK DRIVE HAVING FIRST-WRITTEN SERVO WEDGE MARKED AND METHOD FOR FORMING MARKED SERVO WEDGES

BACKGROUND OF THE INVENTION

1. Field of the Invention

The invention relates generally to a read/write head positioning system used in magnetic data storage devices, such as computer hard drive memories, and, more specifically, to a method and apparatus for marking and detecting particular servo wedges to reduce the effect of closure error.

2. Description of the Related Art

Hard disk drives are used in computer systems to provide primary storage for large amounts of information. Data in a hard disk drive is stored and retrieved by positioning a read/write transducer or "head," mounted on an actuator, over concentrically located areas defining tracks on a surface of a magnetic disk. Multiple such heads and disk surfaces are common in a disk drive. During normal operation, each disk is rotated at a relatively high RPM, e.g., on the order of 4200–7200 RPM, and each transducer is repositioned to store and retrieve the data. The transducer is positioned by means of a servo control system.

In conventional disk drives, the servo control system positions the transducer by reading servo sectors or "wedges" spaced-apart at regular intervals on each track to form a "servo track." This is known as an embedded or sampled servo system, where the servo system reads each wedge to calculate a position error signal (PES) and provide a correction current to the actuator for maintaining (track following) the transducer over a track. The servo system is designed to have a compensator which operates at a particular bandwidth to respond to minute errors which occur from wedge-to wedge.

The servo tracks are written during manufacturing of the disk drive by a servo writer unit. The servo writer stores a pattern for the servo wedges on each track and writes the pattern of wedges at precisely timed intervals. Each wedge is numbered according to scheme of identification and wedges at the same circumferential position across the disk (e.g. like spokes in a wheel) have the same wedge number. Ideally, the servo track is written so that a line describing the path of a transducer following the center of each wedge would be a perfect circle. Unfortunately, such an ideal situation is not feasible, therefore the pattern of wedges may be written with small deviations from the perfect circle due to disk runout and vibration which can occur during servo track writing.

Conventionally, the servo writer performs a repeated series of operations which includes a mechanical movement of the actuator to a desired track position, followed by writing the servo track pattern. The operation is repeated for each servo track required, typically in the thousands. In order to reduce the time required for writing such thousands of servo tracks, the servo writer begins writing the pattern of wedges as soon as the actuator has settled in a stable position after movement. This means that the first wedge to be written on each track can vary from track to track.

Each servo track written in the above manner will "freeze" the systematic deviations referenced above as written-in deviations such that the servo control system is still generally able to track follow using the compensator designed for the disk drive. However, a problem may arise when the servo control system attempts to provide a correction after reading the first written wedge on a track, having just previously correcting for the last written wedge. In effect, any systematic behavior pattern is truncated after writing the last wedge on a track, repeating the behavior pattern starting with the first written wedge. Consequently, the servo control system may tend to overcorrect for a perceived PES arising from reading the first-written wedge. This overcorrection can lead to inadvertent encroachment of the write transducer over an adjacent track and data corruption. The phenomena of pattern deviation between the last-written wedge and first-written wedge on each track is known as "closure error." In some disk drives, the closure error can be large enough to cause a track to be retired and if a sufficient number of tracks are retired, rejection of the disk drive.

What is needed is a method and apparatus for disk drive servo control systems to maintain head position within acceptable limits in light of such closure error.

SUMMARY OF THE INVENTION

The aforementioned needs are satisfied in one aspect by a hard disk drive for storing information, the device comprising a magnetic disk having a plurality of servo wedges positioned in substantially circular patterns forming concentric servo tracks and wherein a marker is used to identify the location of the transition between the first and last servo wedges written on the servo track and a spindle which rotates the magnetic disk. In this aspect, the invention also comprises a transducer for writing data to and reading data from the rotating magnetic disk and an actuator coupled to the transducer wherein the actuator moves the transducer such that the transducer can be positioned over a selected region of the magnetic disk. The system also includes a control system that controls the positioning of the transducer over the magnetic disk by the actuator, wherein the control system receives signals from the transducer indicative of the transducer encountering the marker such that the control system is aware of the transition between the first and last written servo wedges of each concentric servo track on the magnetic disk such that the control system can thereby account for closure error occurring at the transition between the first and last servo wedge written on each concentric servo track while controlling the positioning of the transducer.

In this way, the control system of the hard disk drive can be advised of the transition between the first and the last written servo wedges during track following. As such, the algorithm used to ensure proper positioning of the transducer with respect to the servo track can be modified such that the discontinuity caused by closure error at the transition can be dealt with in a more efficient manner during subsequent read/write operations of the hard disk. In one aspect, the control system will moderate the response of transducer realignment and positioning following the encounter of a closure error by deploying a slow compensator. Preferably the compensator has a damping factor for providing a slow response.

In another aspect, the invention comprises a method for writing servo tracks on a disk surface wherein the method comprises forming a marker to identify the location of a transition between first and last formed wedges on the track.

DETAILED DESCRIPTION OF THE INVENTION

Figure 1:
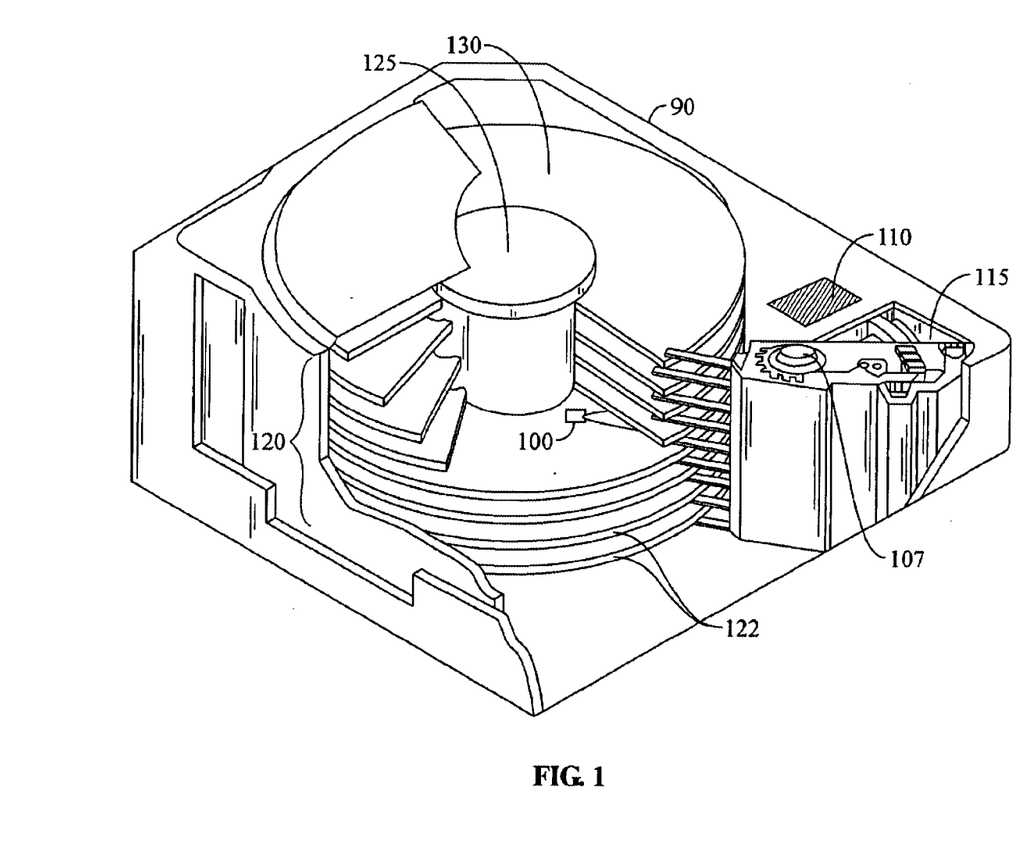
FIG. 1 is a cross-sectional representation of a hard disk drive suitable for practicing the invention.

FIG. 1 illustrates a disk drive 90 and its component parts suitable for practicing the invention. The basic components of the disk drive 90 comprise a disk array 120, a plurality of transducers 100, and a control system 110 which interact to store electronically encoded data.

As shown in the cutaway view of FIG. 1, the disk array 120 comprises a plurality of magnetic disks 122, substantially circular in shape and arranged in a parallel stack about a spindle 125. The spindle 125 and magnetic disks 122 are rotated at a high rate of speed during operation of the disk drive 90 with the disk surfaces 130 passed in close proximity to the transducers 100. The transducers 100 function to magnetically encode the disk surfaces 130 with data and subsequently retrieve the data encoded on the disk surfaces 130. A control system 110 is additionally present which directs the action of a voice coil motor 115 to move an actuator 107 which results in movable positioning of the transducer 100.

Figure 2:
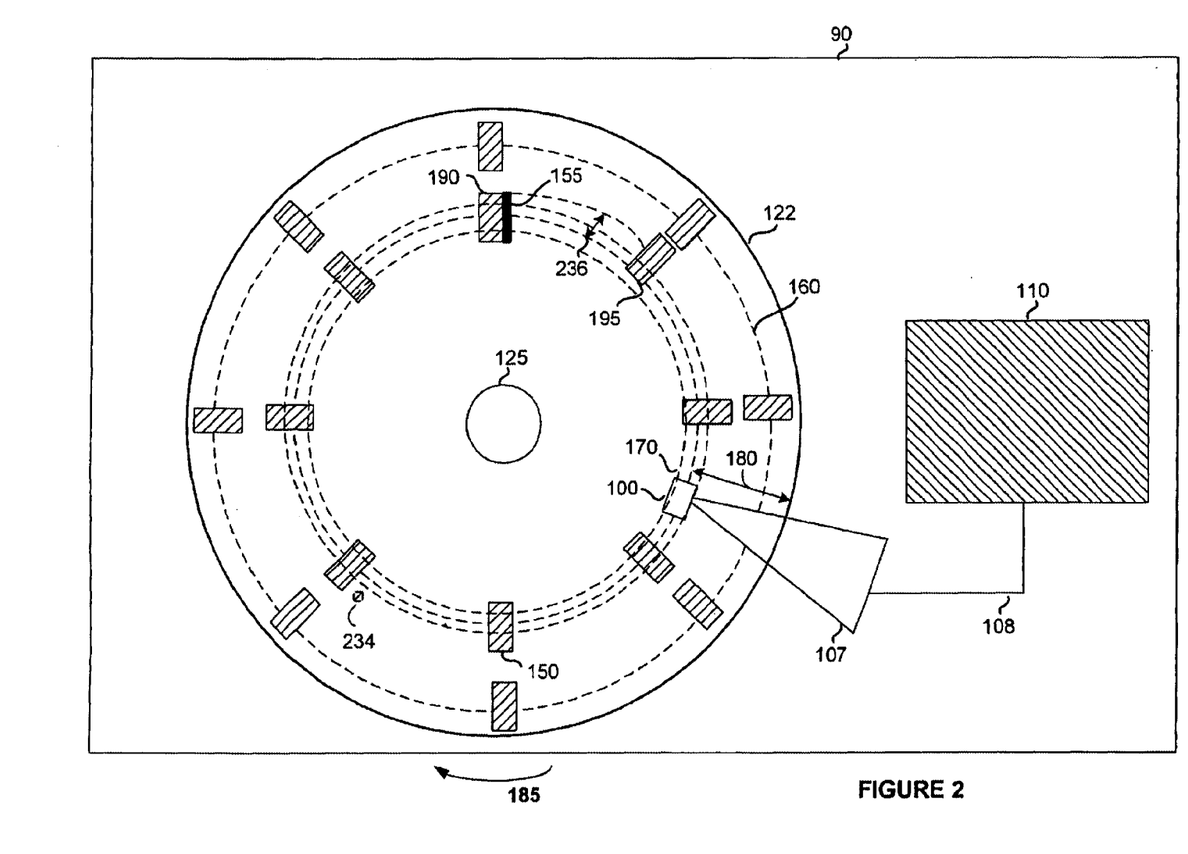
FIG. 2 is an illustration of servo wedge patterning and closure marker placement on a magnetic disk surface for use by a control system.

A more detailed illustration of the disk drive 90 is shown in FIG. 2. The disk drive 90 comprises the magnetic disk 122 which has a plurality of servo wedges 150 positioned as shown in substantially circular patterns forming concentric servo tracks 160. A marker 155 is associated with one of the servo wedges 150 which, in the illustrated embodiment, is the first-written servo wedge 190 on each track 160. The marker 155 thereby may be used to identify a transition point on the servo track 160 between a last-written servo wedge 150 designated as 195 and the first-written servo wedge 190.

The disk drive 90 further comprises the spindle 125 which provides disk rotation 185 in a known manner. A transducer 100 reads and writes data on the disk 122 and is attached to the actuator assembly 107 for radial positioning 180 of the transducer 100 to read or write selected regions of the surface of the disk 122.

The control system 110 in the disk drive 90 controls the positioning of the transducer 100 via the actuator assembly 107. Upon receiving signals from the transducer 100 generated while reading the servo wedges 150 in the servo track 160, the control system 110 thus attempts to align the transducer 100 so that a path 170 defined by the relative motion between the rotating disk surface 130 and the transducer 100 generally aligns with one of the servo tracks 160 and the corresponding data areas. Efficient radial repositioning of the transducer 100 relative to adjacent servo wedges 150 is necessary to account for the small differences in radial position 234 of the adjacent servo wedges 150.

Efficient radial repositioning of the transducer 100 relative to adjacent servo wedges 150 is necessary to account for the small differences in radial position 234 of the adjacent servo wedges 150. In particular, there may be a closure error 236 occurring in the transition from the last-written servo wedge 195 and the first-written servo wedge 190. During track following operations, the transducer 100 encounters the marker 155 while reading the servo wedges 150 in the servo track 160 and provides a signal 108 received by control system 110, thereby enabling the control system 110 to account for the closure error 236 in one or more ways as described below.

Figure 3:
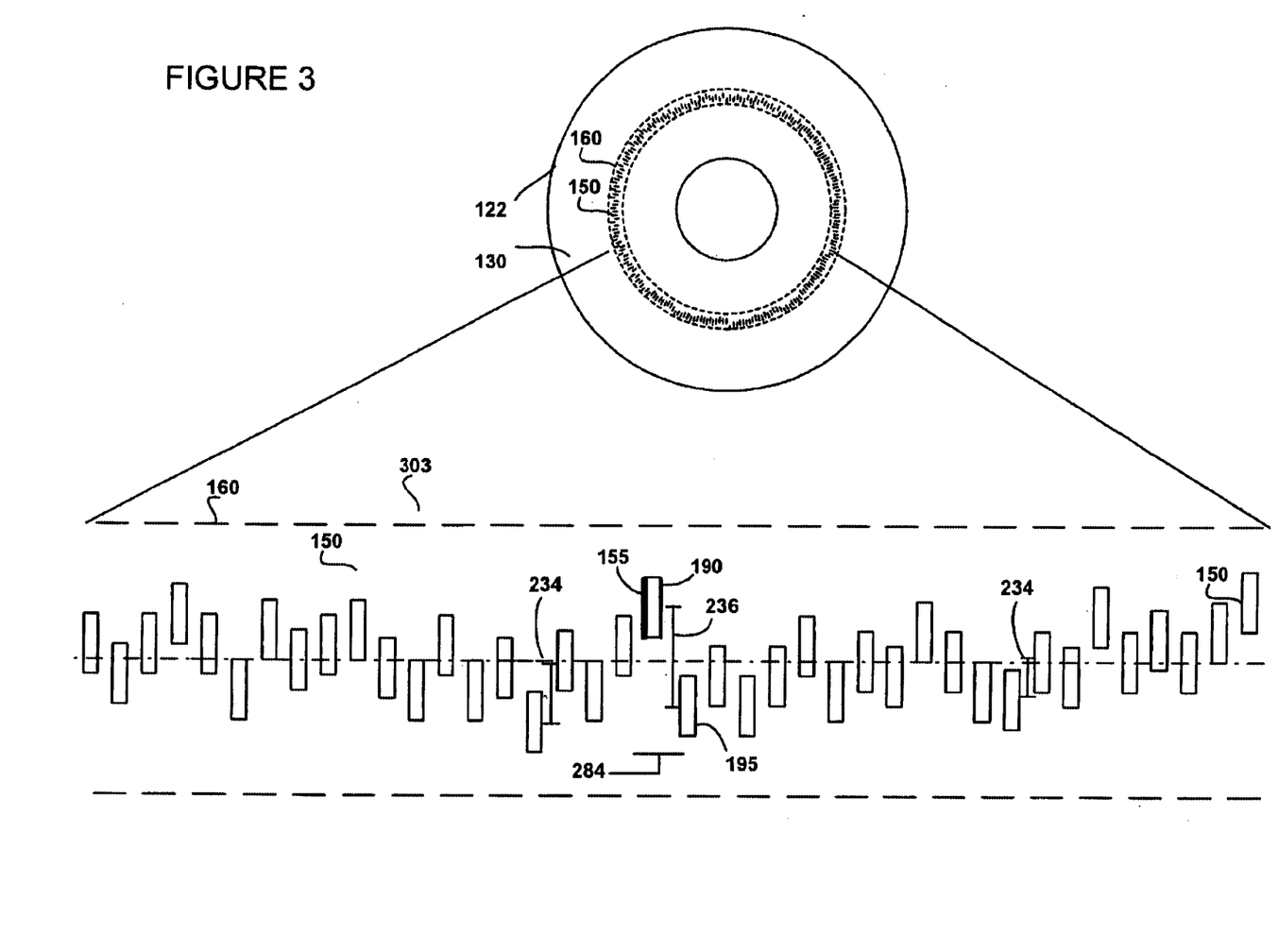
FIG. 3 is a detailed illustration of the closure error phenomenon on a servo track with a closure marker of the first-written wedge.

The occurrence of the radial displacement between the first and last written servo wedges resulting in closure error is illustrated in greater detail in FIG. 3. A magnified portion of the servo track 301 containing the servo track area 160 where closure error is likely is further illustrated. As shown in FIG. 3, there is a pattern of small positional deviations 234 between successive servo wedges 150 that are the result of the servo writing process. Typically, the radial variation 234 between adjacent servo wedges 150 occurs with an approximate magnitude of 2–3% with an occasional variance on the order of 4–6%. The control system responds to these variations using a conventional compensator having an appropriate bandwidth and follows the servo track. The apparent radial variation (PES) between the first and last written servo wedge 190, 195 however, can vary by approximately 6–9% with even larger variations possible due to the aforementioned truncation of the written servo track pattern. If the control system attempts to respond to the larger PES from closure error with the normal compensator, it may overreact and cause the transducer to encroach on an adjacent track.

By identifying the circumferential position where the closure error is likely, the marker 155 of the present invention can be used to signal the control system 110 to generate a response. In one embodiment, the control system 110 may deploy a compensator having slower damping factor. The slower damping factor moderates the movement of the transducer 100 during track following to reduce the probability of overcorrection. In another embodiment, the control system may reduce the bandwidth of the compensator by modifying phase or gain margin. Thus, the closure marker 155 improves the ability of the control system 110 to respond to closure error without overcorrection.

It will be appreciated by those of skill in the art, that in addition to the servo wedge 150 and closure marker 155 pattern shown in the illustrated embodiment, other patterns or arrangements exist which may also be used with similar results. Other embodiments which exist for the placement of servo wedges 150 and closure marker 155 may for example include: (1) patterning of more servo wedges 150 per servo track 160, (2) patterning of less servo wedges 150 per servo track 160, (3) servo track patterning in which data is not stored between servo wedges 150, (4) patterning of the closure marker 155 in one or more servo wedges 150 within each servo track 160 and (5) patterning of the closure marker 155 outside of a servo wedge 150 or servo track pattern 160.

Furthermore, in addition to the closure marker 155 placement being adjacent to the first written servo wedge 190 as illustrated, the marker 155 can be placed in other positions and orientations with equivalent effectiveness in identifying the closure error position 284 of the servo track 160. For example, the last written servo wedge 195 can contain the closure marker 155 to indicate the position between the first 190 and the last 195 written servo wedges. Additionally, the closure marker 155 may comprise a plurality of closure markers used to indicate the track closure position 284. In each of the above stated embodiments the closure marker 155 is used to indicate the position where track closure 284 occurs and is used by the control system 110 to implement alternative transducer positioning algorithms as necessary to insure rapid response in track following and more efficiently correct for the offset 236 of the closure position 284.

Figure 4:
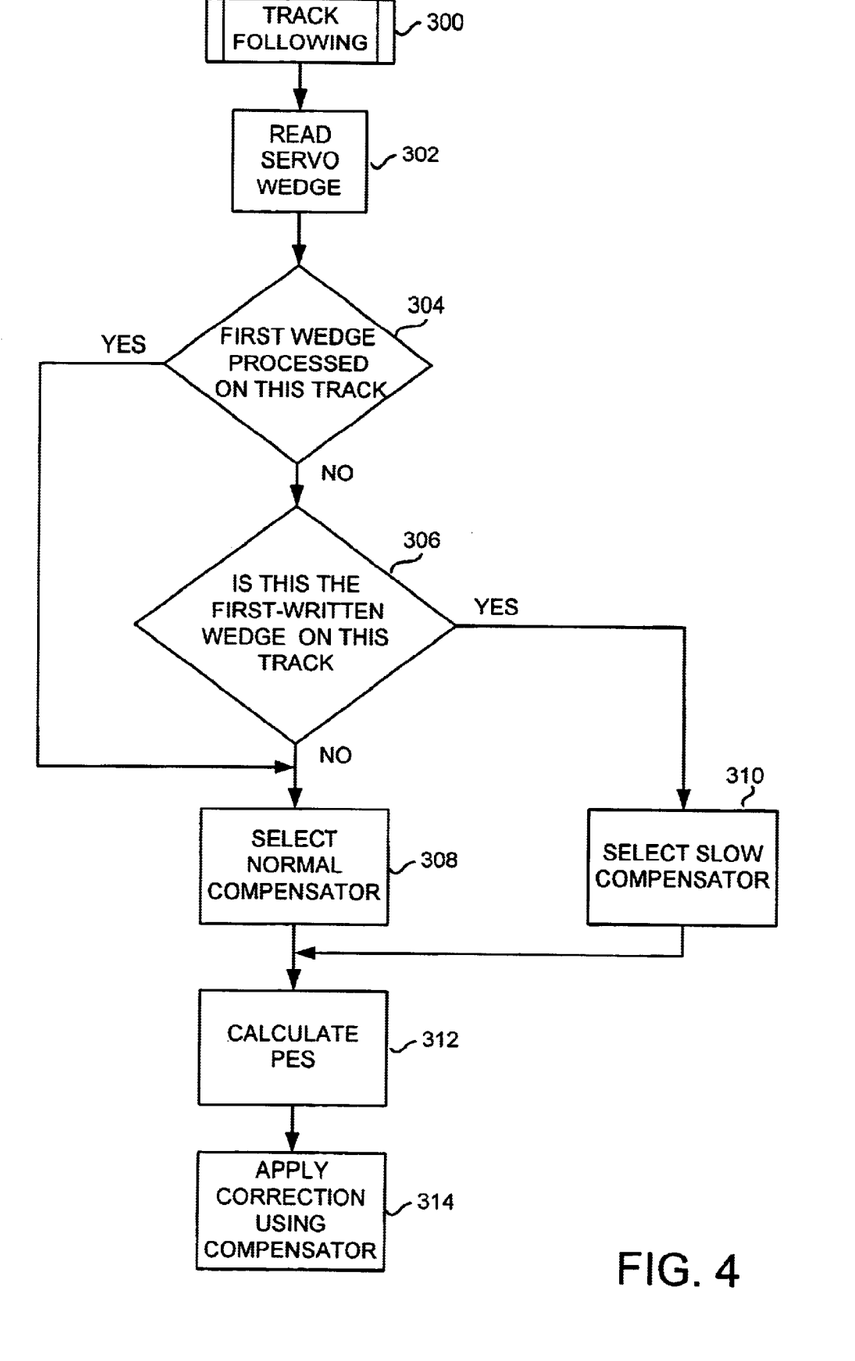
FIG. 4 is a flow chart illustrating the method by which the control system makes use of the marker during track following.

The track following process 300, illustrated in FIG. 4, shows the process by which the servo wedges 150 and closure markers 155 are interpreted by the transducer 100 and control system 110 during operation of the disk drive 90. The track following cycle 300 maintains the position of the transducer 100 along the preferred track centerline while the disk 122 is rotating. In step 302, the control system 110 reads a servo wedge. At step 304, the control system 110 determines if the servo wedge is the first wedge to be processed for the current track. If so (YES), the method proceeds to step 308, selecting a normal compensator having the bandwidth required for maintaining track following. If not, (NO) the method proceeds to step 306 to determine if the servo wedge is the first-written wedge on the track. The determination of first-written wedge is made by testing for the presence of a closure error marker as described above. If the wedge is not the first-written wedge (NO), the method proceeds to step 308 and selects the normal compensator. If the marker is detected, indicating the first-written wedge (YES), the method proceeds to step 310, selecting a slow compensator having for example reduced bandwidth or a slower damping factor. Having thus selected an appropriate compensator, the method proceeds to step 312, calculating a PES to determine a correction using the compensator and then to step 314, applying the correction to re-position the actuator to follow the track.

Figure 5:
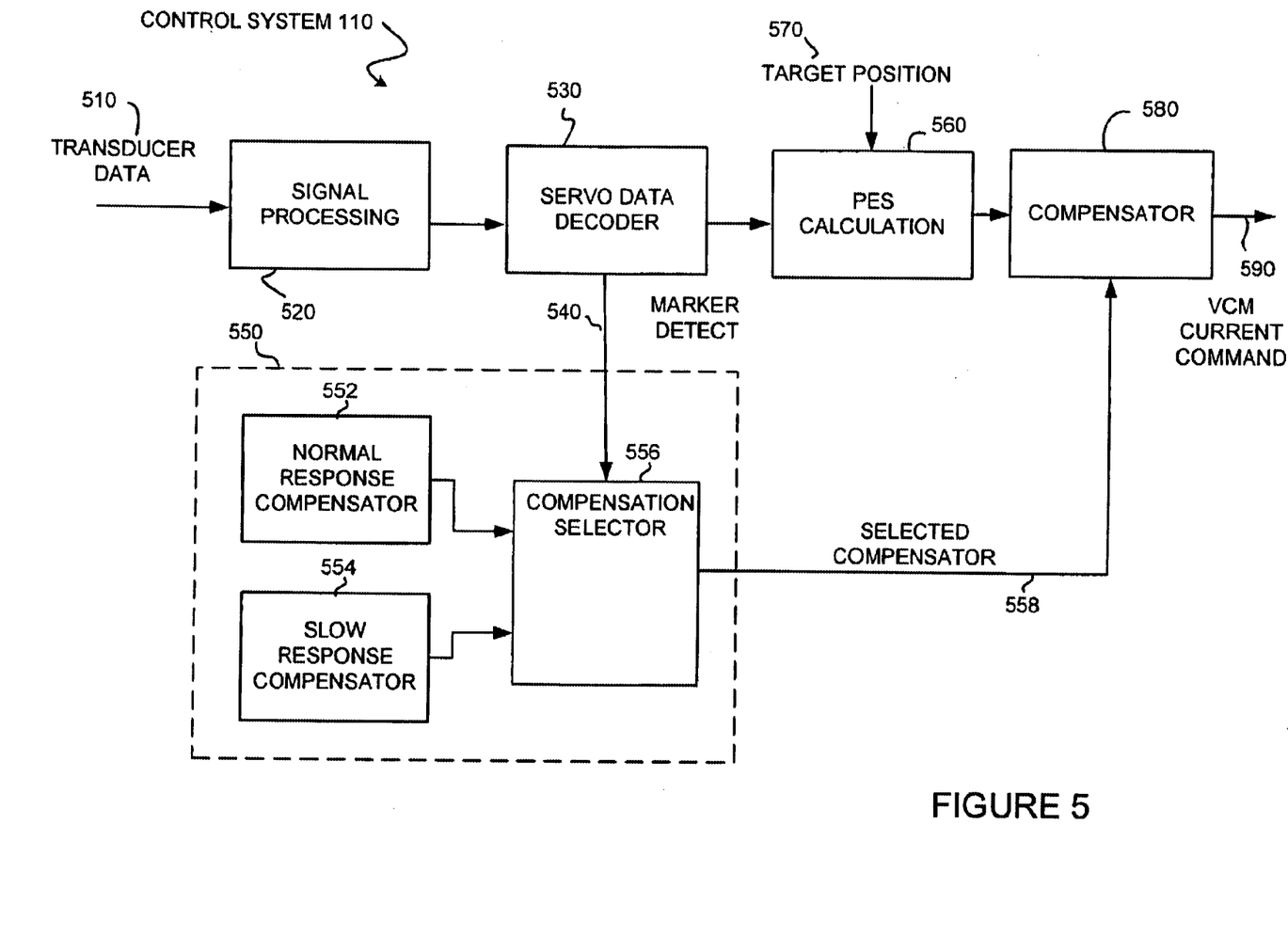
FIG. 5 is a block diagram of the control system illustrating the response module which responds to the closure marker.

FIG. 5 illustrates a more detailed functional view of the control system 110. The control system 110 typically comprises a microprocessor, a servo channel and controller, and associated servo firmware routines. The process begins with the control system 110 receiving transducer data 510 representing a servo wedge 150. A signal processing module 520 is used for filtering and conditioning of the transducer data 510. Thereafter, a servo data decoder module 530 converts the data to an appropriate form with servo wedge data and marker information identified and extracted for subsequent possessing.

The servo data decoder module 530 additionally detects the presence of marker information in the transducer data 510. When a marker 155 is detected 540, the servo data decoder 530 signals a marker response module 550 for processing. The marker response module 550 preferably selects a compensator 580 for use in correcting for position error (PES). In default mode, marker response module 550 selects 556 a normal response compensator 552 as a selected compensator 558. If a marker 155 is detected 540 by servo data decoder 530, marker response module 550 instead selects 556 slow response compensator 554 as the selected compensator 558.

Positioning information is further passed from the servo data decoder 530 to a position error signal (PES) calculation module 560. The PES calculation module 560 compares a desired target position 570 of the transducer 110 to the actual transducer position based on the transducer data 510 received by the control system 110. Using the comparison between the target position 570 and the actual transducer position as a reference, compensator module 580 generates and issues a correction current command 590 to the voice coil motor assembly 115 to re-position the transducer 100. Slow response compensator 554 provides a "soft" response to account for closure error, thereby avoiding overcorrection.

Figure 6:
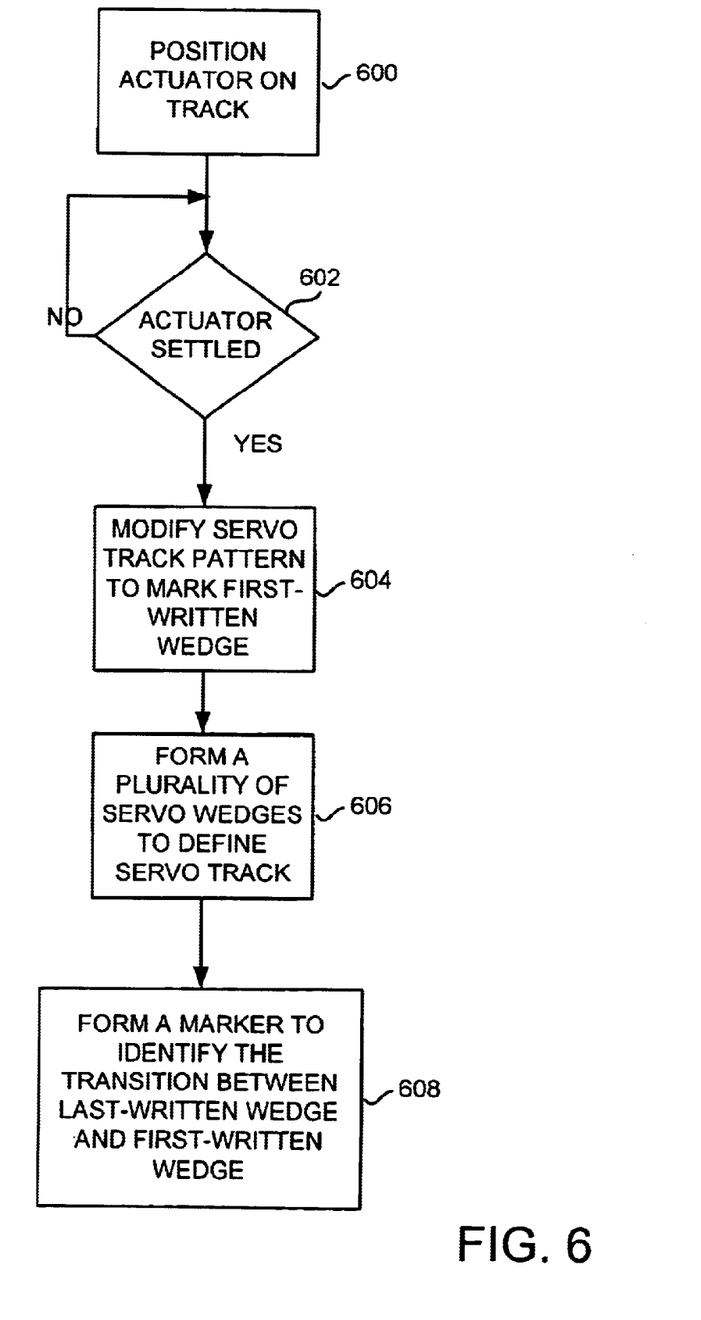
FIG. 6 is a flow chart illustrating the method for forming the marker during servo writing of the disk drive servo tracks.

FIG. 6 illustrates a preferred method for writing servo tracks in a hard disk drive using a servo writer. In step 600, the servo writer positions the actuator at a desired radial track position on the disk. At step 602, the servo writer waits for the actuator to settle, allowing vibration induced from the movement to die out. At step 604, the servo writer modifies a servo track pattern of servo wedges stored in a memory to mark the servo wedge which corresponds to the first wedge to be written on the present track. At step 606, the servo writer forms a plurality of servo wedges on the disk surface to define a servo track. As a consequence, in step 608, the servo writer forms a marker to identify the transition between the last-written wedge and the first-written wedge.

What is claimed is:

1. A hard disk drive for storing information, the device comprising:
   a magnetic disk having a plurality of servo wedges positioned in substantially circular patterns forming concentric servo tracks and wherein a marker is formed on the disk to identify the location of the transition between the first and last servo wedges written on the servo track;
   a spindle which rotates the magnetic disk;
   a transducer for writing data to and reading data from the rotating magnetic disk;
   an actuator coupled to the transducer, wherein the actuator moves the transducer such that the transducer can be positioned over a selected region of the magnetic disk; and
   a control system that controls the positioning of the transducer over the magnetic disk by the actuator, wherein the control system receives signals from the transducer indicative of the transducer encountering the marker such that the control system is aware of the transition between the first and last written servo wedges of each concentric servo track on the magnetic disk such that the control system can thereby account for closure error occurring in the transition between the first and last servo wedges written on the servo track while controlling the positioning of the transducer.

2. The hard disk drive of claim 1 wherein the control system accounts for the closure error by responding to the marker to reposition the transducer.

3. The hard disk drive of claim 2 wherein the marker response comprises deploying a slow response compensator.

4. The hard disk drive of claim 3 wherein the slow response compensator comprises a compensator with a damping factor which provides a slow response.

5. The hard disk drive of claim 1 wherein the marker comprises a plurality of markers written to one or more servo wedges along the concentric servo tracks.

6. The hard disk drive of claim 1 wherein the marker identifies the location of the first servo wedge formed on the servo track.

7. The hard disk drive of claim 1 wherein the marker identifies the location of the last servo wedge formed on the servo track.

8. The hard disk drive of claim 1, wherein the closure error is indicative of a radial displacement on the disk between the first written servo wedge and the last written servo wedge.

9. The hard disk drive of claim 8, wherein the servo wedges defining a servo track are spaced circumferentially about the disk and wherein the space between adjacent servo wedges of each servo track define data areas in which data accessible by the transducer can be stored for subsequent retrieval.

10. A method of writing servo tracks on a magnetic storage disk in a disk drive, the method comprising:

forming a plurality of servo wedges on the magnetic disk positioned in substantially circular patterns to thereby define concentric servo tracks; and forming a marker on the storage disk to identify the location of the transition between the first and last servo wedges formed on the servo track such that upon subsequent track following, the location of the transition between the first and last written servo wedges on the track is known.

11. The method of claim 10, wherein forming a plurality of servo wedges comprises using a servowriter to write servo wedges about a circumferential path of the disk to as to define a generally circular servo track.

12. The method of claim 11, wherein writing the servo wedges comprises writing information to the disk that is accessible by a transducer of a hard disk drive that is indicative of the location of the servo wedge on the disk such that a control system of the hard disk drive is aware of the location of the transducer with respect to the disk during track following.

13. The method of claim 12, wherein writing the servo wedges further comprises writing information to the disk that is interpreted by the control system to generate a marker response to account for the closure error.

14. The method of claim 13, wherein writing the servo wedges further comprises writing information to the disk that is interpreted by the control system to generate the marker response wherein the marker response comprises selecting a slow compensator following the occurrence of closure error.

15. The method of claim 14, wherein writing the servo wedges further comprises writing information to the disk that is interpreted by the control system to generate the transducer position correction signals wherein the transducer position correction signals comprise a slow damping factor account for closure error.

16. The method of claim 15, wherein forming a marker on the servo track comprises forming a marker in a selected servo wedge.

17. The method of claim 10, wherein forming a marker on the servo track comprises forming a marker adjacent to a selected servo wedge of the servo track.

* * * * *